United States Patent
Spiegelman et al.

(10) Patent No.: US 6,869,463 B2
(45) Date of Patent: Mar. 22, 2005

(54) METHOD FOR RAPID ACTIVATION OR PRECONDITIONING OF POROUS GAS PURIFICATION SUBSTRATES

(75) Inventors: Jeffrey J. Spiegelman, San Diego, CA (US); Daniel Alvarez, Jr., San Diego, CA (US); Joshua T. Cook, San Diego, CA (US)

(73) Assignee: Mykrolis Corporation, Billerica, MA (US)

( * ) Notice: Subject to any disclaimer, the term of this patent is extended or adjusted under 35 U.S.C. 154(b) by 0 days.

(21) Appl. No.: 10/692,019

(22) Filed: Oct. 23, 2003

(65) Prior Publication Data

US 2004/0159234 A1 Aug. 19, 2004

Related U.S. Application Data

(63) Continuation of application No. 10/173,335, filed on Jun. 14, 2002, now Pat. No. 6,638,341.

(51) Int. Cl.$^7$ .............................................. B01D 53/04
(52) U.S. Cl. .............................. 95/104; 95/128; 95/148
(58) Field of Search .......................... 95/104, 128, 148

(56) References Cited

U.S. PATENT DOCUMENTS

| | | |
|---|---|---|
| 5,013,335 A | 5/1991 | Marcus |
| 5,160,512 A | 11/1992 | Talu |
| 5,540,757 A | 7/1996 | Jordan, Sr. |
| 5,676,737 A | 10/1997 | Whitlock |
| 5,968,232 A | 10/1999 | Whitlock |
| 6,221,132 B1 | 4/2001 | Dong et al. |
| 6,461,410 B1 | 10/2002 | Abe et al. |
| 6,638,341 B1 | 10/2003 | Spiegelman et al. |

OTHER PUBLICATIONS

Pearlstein, R. M., et al., "Evaluating electronics–grade gas–line purging requirements," Media for Solid State Technology, [online], Mar., 2001 [retrieved on Oct. 8, 2004]. Retrieved from the Internet <URL: http://sst.pennnet.com/Articles/Article_Display.cfm?Section=ARCHI&ARTICLE_ID=95491&VERSION_NUM=1&p=5.

*Primary Examiner*—Robert H. Spitzer
(74) *Attorney, Agent, or Firm*—Hamilton, Brook, Smith & Reynolds, P.C.

(57) ABSTRACT

A method is described for rapid and economical activation and/or preconditioning of gas purification substrates by providing forced convection of the preconditioning or activating gas through the pores of the substrate. The gas is pumped into the substrate-containing vessel and raised to an elevated pressure, which is maintained for a short predetermined time, followed by venting of contents of the vessel. The vessel is again pressurized with the purging gas to an elevated level, and the elevated pressure is maintained for a short predetermined time, followed by venting of the vessel. This cycle is repeated as often as needed or desired. Activation and/or preconditioning can be accomplished in a much shorter time and with much less gas usage compared to diffusion preconditioning and activation processes. This process is particularly suited for preconditioning and activation of gas purifier substrates for decontamination of gases down to $\leq 1$ ppm contaminants.

23 Claims, 3 Drawing Sheets

Figure 1 - Prior Art

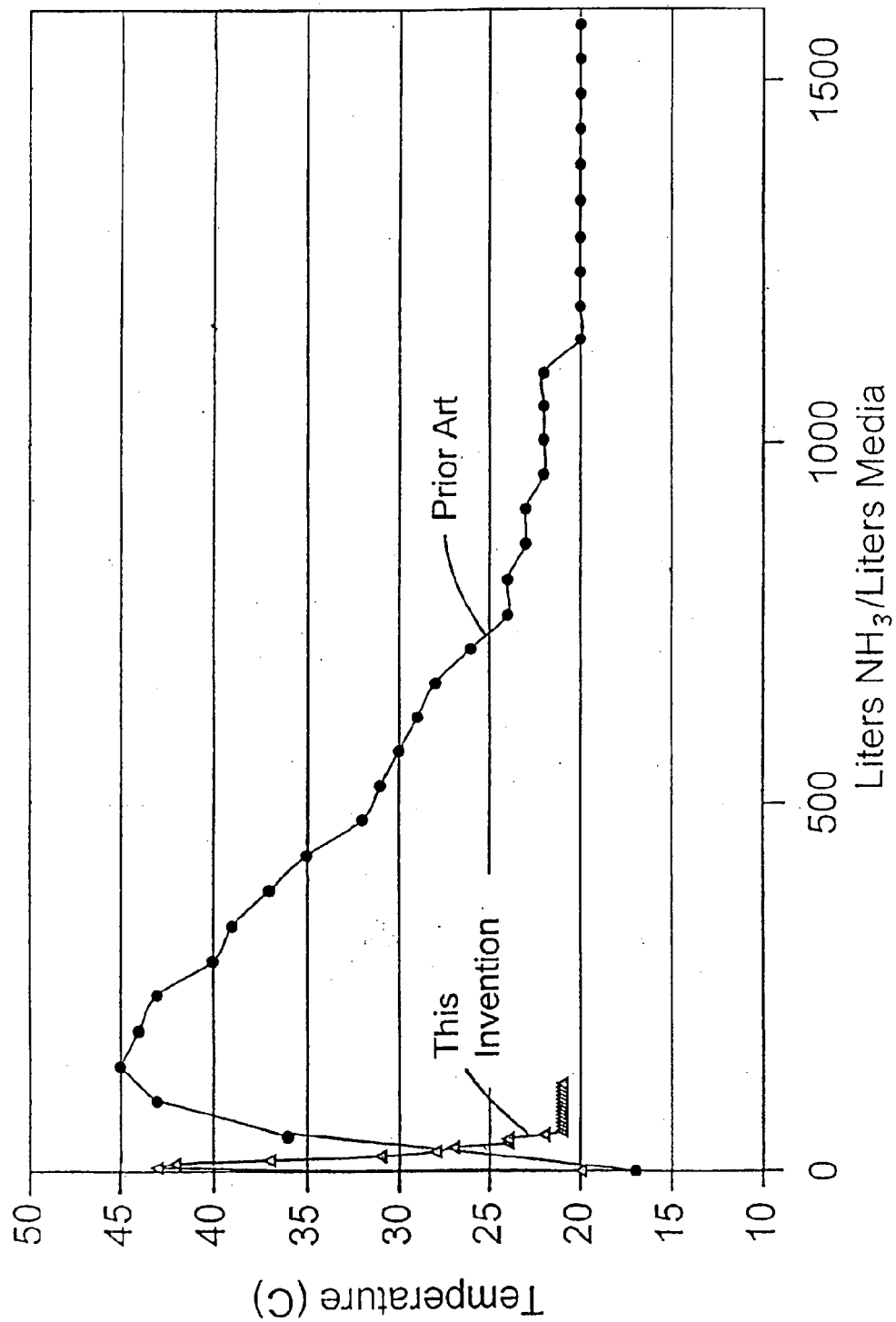

METHOD FOR RAPID ACTIVATION OR PRECONDITIONING OF POROUS GAS PURIFICATION SUBSTRATES

CROSS-REFERENCES TO RELATED APPLICATIONS

This application is a continuation of U.S. patent application Ser. No. 10/173,335 filed Jun. 14, 2002, issued as U.S. Pat. No. 6,638,341 on Oct. 28, 2003, which is incorporated herein by reference in its entirety.

BACKGROUND OF THE INVENTION

1. Field of the Invention

The invention relates to the activation or preconditioning, or both, of porous gas purification substrates. More particularly it relates to activation or preconditioning of such substrates rapidly and with reduced gas usage.

2. Background Information

Purification (decontamination) of many types of gases is done by passing a contaminated gas or gas mixture over a porous substrate within a vessel. The contaminants in the gas are trapped on active sites on the surface of the substrate and the gas upon exiting from the vessel has a much reduced concentration of contaminants. This type of gas purification is commonly used to reduce the contaminant concentration of a manufacturing process gas which is subsequently to be used in the manufacture of high purity materials such as semiconductor wafer materials and prosthetic devices. In such purification processes the contaminate level of the gas is often reduced to or below 1 ppm and in many processes can be reduced into the range of parts per billion (ppb) and even in some cases into the parts per trillion (ppt) range.

Substrates may be in the form of flat or curved plates, small shaped objects such as rings, spheres, saddles or the like, or be particulate or granular materials. While the actual substrate form is often a matter of choice based on factors such as acceptable gas pressure drop through the vessel, the substrate normally must be highly porous so that it has a high surface area, since contaminate removal from gases is essentially a surface phenomenon. Many porous substrates have surface areas on the order of 100 square meters per gram ($m^2/g$) or higher.

When a new substrate material is initially placed into a gas purification vessel the pores of the substrate are filled with a packing gas, which is simply environmental gas to which the substrate has previously been exposed. Commonly this is air or an inert gas. Since the presence of the packing gas in the pores blocks access of the contaminated gas to many of the active removal sites on the surface of the substrate, the packing gas must be removed by purging and the substrate saturated, usually with the same gas as will be purified or a component thereof, before the purification operation can begin. The same type of initial gas removal must also be performed when a vessel has been shut down and vented (such as for repairs) and is to be again placed in operation. This removal and replacement process is commonly referred to as "preconditioning" of the substrate.

In some preconditioning processes chemical reactions may also occur, generating water vapor or other gaseous by-products. The flow of the preconditioning gas must also continue until the reactions have ceased and the gaseous by-products have been purged from the system.

There is an equivalent process used when the active sites on a substrate are of only limited decontamination activity initially. Such sites must be "activated" by contacting them with an activating gas, causing them to become much more active for decontamination. The mechanism of activation is not important for this invention. What is important, however, is that the activating gas must come into contact with the surface sites of the substrate in order to activate them. Thus the purging gas must be forced to as many of the activation sites as possible during activation. A particular substrate may require both activation and preconditioning, which may occur simultaneously or in sequence, and may be accomplished either by different gases or by the same gas.

It will be evident that for both preconditioning or activation processes it is important that the packing gas be removed from all areas of the surface of the substrate and that all sites must be contacted if they are to be activated. While this is readily accomplished for those surface sites and areas to which easy access of a flowing preconditioning or activation gas can be obtained, such as the outer surface of the substrate plate, object or granule, it becomes much more difficult for those areas of the substrate that are deep within the pores of the substrate.

In past gas purification processes, activation and preconditioning gases have been flowed through the vessel and across the substrate and have reached into the pores of the substrate by mass transfer/molecular diffusion. Very long activation or preconditioning periods have been required since such diffusion occurs slowly, particularly as the gas traverses into greater depths of the pores. It is quite common for it to require 24 to 48 hours for satisfactory activation or preconditioning of an entire substrate to be accomplished by flow-generated mass transfer/molecular diffusion. In addition, such diffusion does not provide thorough activation or preconditioning, since as a pore narrows over its length, there is greater resistance to diffusion of the purging or activating gas through it, such that many sites requiring activation or areas requiring purging of packing gases simply cannot be reached by the slowly diffusing gas within a reasonable period of time. During prolonged preconditioning or activation periods required, it is not uncommon to have excessive exotherms occur within the substrate. In order to avoid such exotherms (which could damage the substrates) it is often necessary to limit the flow rate of the purging gas through the vessel, thus also reducing the rate of diffusion of the purging gas into the pores and prolonging the activation or preconditioning time period.

Forced convection purging of equipment has been used in some of the chemical and petroleum industries, but it has been with respect to macro-scale processes in which only relatively coarse and limited removal of packing gases or limited activation of active sites has been required. Such has not previously been known in or believed applicable to gas purification reactors and vessels in which ultra-high purity ($\leq 1$ ppm contamination) must be accomplished.

SUMMARY OF THE INVENTION

The present invention overcomes the problems of activation and preconditioning in prior art gas purification systems, and materially speeds up activation and preconditioning, generally eliminates the likelihood of excessive exotherms, and permits much more thorough saturation of the substrate with the activation and preconditioning gases. This is accomplished in the present invention by providing forced convection of the preconditioning or activating gases through the pores of the substrate. (For brevity herein, preconditioning and/or activation gases will sometimes be referred collectively or singly as "purging" gases.) In the process of the present invention a purging gas or gas mixture to be used for preconditioning or activating is pumped into the substrate-containing vessel, on which all outlet ports have been closed. The amount of gas used is sufficient to raise the gas pressure to several times the "atmospheric" pressure. The elevated pressure is maintained for a short predetermined time and then the outlet ports of the vessel are opened and the contents of the vessel are vented to atmospheric pressure. This will include both purging gas and packing gas displaced during the pressurization. Promptly thereafter the outlet ports are closed and the vessel is again pressurized with the purging gas to an elevated level, and the elevated pressure is maintained for a short predetermined time, again followed by venting of the vessel. This cycle is repeated as often as needed or desired.

We have determined that such pressurizing and venting cycles when repeated for at least two, preferably at least four, and more preferably at least ten, times will result in most if not all of the sites being activated and most if not all of packing gas (and any gaseous byproduct if a chemical reaction has occurred) being purged from the substrate and vessel. The forced convection of this process causes the purging gas to be forced through essentially all of the narrowest portions of the porous substrate, such that virtually all activation sites and gas-containing recesses are reached by the purging gas, in a manner much more rapid and much more thorough then what is accomplished by diffusion of a purging diffusion. This results in not only much more rapid and complete activation or preconditioning, but also in the use of far less purging gas than is required for the long flow periods necessary for diffusion activation or preconditioning.

BRIEF DESCRIPTION OF THE DRAWINGS

FIG. 3 is a composite of FIGS. 1 and 2 showing the direct comparison of the forced convection data (left edge of the graph; triangles) of this invention with data from the prior art diffusion process (extending all the way across the graph; closed circles).

DETAILED DESCRIPTION AND PREFERRED EMBODIMENTS

Figure 1:
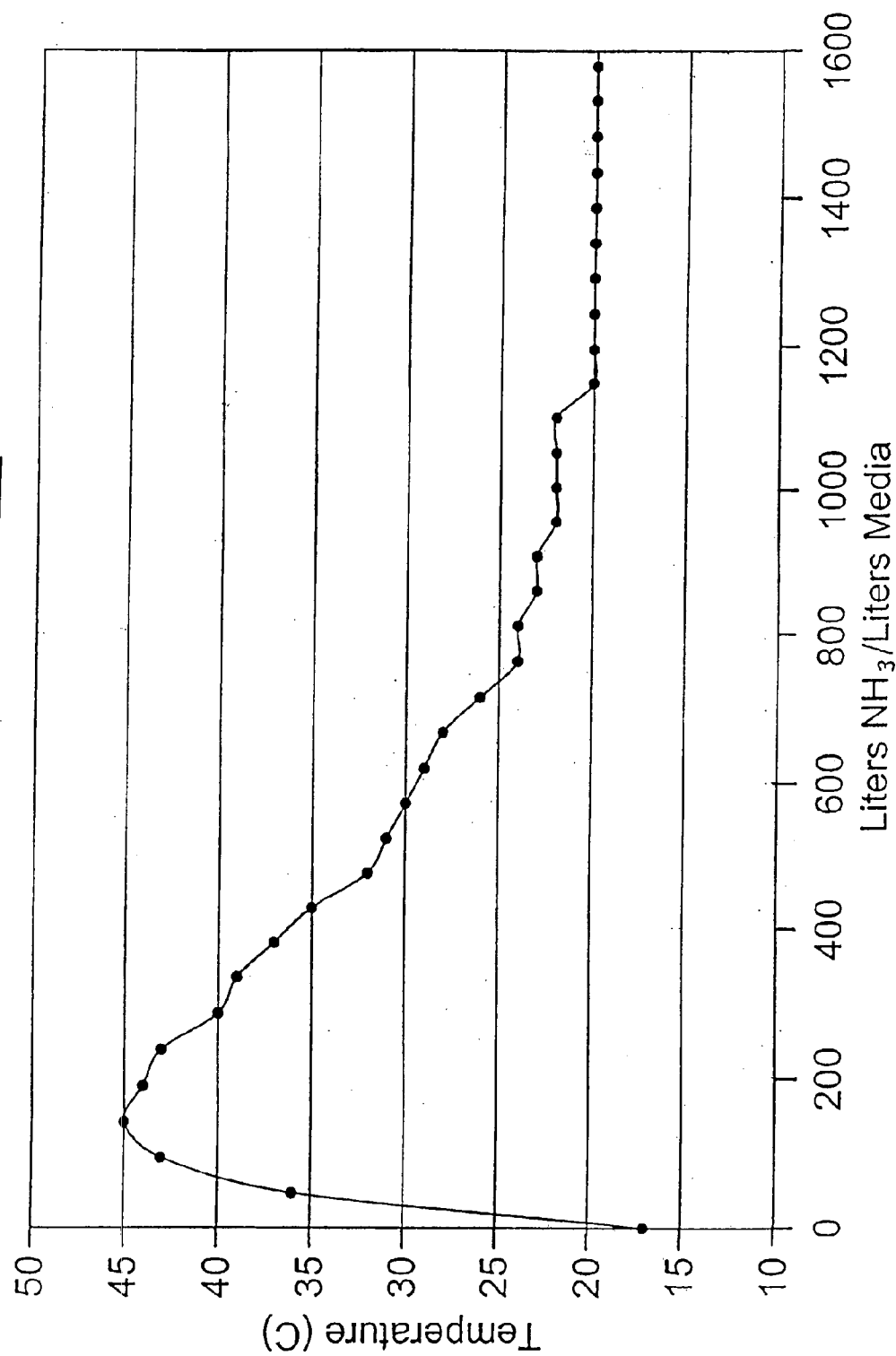
FIG. 1 is a graph from a typical prior art preconditioning process for an ammonia purification vessel using gas-flow-generated mass transfer/molecular diffusion, showing the comparison of quantity of purging gas used versus temperature reached.

The present invention comprises the use of forced convection of a purging gas to activate sites throughout the pores and surface of a substrate and/or to purge a packing gas from a substrate, all in a small fraction of the time previously required for preconditioning or activation by diffusion and with use (and resulting waste by venting) of only a small fraction of the purging gas previously needed by the prior art diffusion processes.

In the present process the purging gas (which may be the activation gas, the preconditioning gas or a gas which serves both purposes) is pumped into the substrate-containing vessel, raised to an elevated pressure and maintained at that pressure for a short predetermined time, following which the contents of the vessel are vented to the atmosphere or to an "atmospheric" pressure collection vessel. Promptly thereafter more purging gas is pumped into the substrate-containing vessel and raised to elevated pressure, maintained at elevated pressure for a short determined time, followed by venting of the vessel contents to the atmosphere or an atmospheric pressure vessel. This cycle is repeated for as many times as necessary to reach the desired level of activation of the active sites of the substrate and/or for removal of substantially all packing gas within the substrate. If during the preconditioning a chemical reaction also occurs which generates moisture and/or another gaseous byproduct, the cycles must also continue until the chemical reaction has reached completion and all generated byproduct is also purged from the system.

We have found that the pressurize-and-vent cycle is conveniently repeated at least two, and preferably at least four, and more preferably at least ten, times. There is no absolute maximum number of cycles, but in practice 200 cycles are anticipated to be sufficient for activation or preconditioning of almost all substrates, and in many cases significantly less cycles (such as 10–100) will be quite adequate. The pressurization is preferably raised to and maintained at a level of at least two times the "atmospheric" pressure, and preferably at least five times the atmospheric pressure. Normally each cycle will return to the same elevated pressure level, but that is not required. By "atmospheric" pressure is meant the pressure of the environment into which the gas in the vessel is vented following the pressurization portion of a cycle, which may conveniently be the open ambient environment or a capture vessel. Preferably however, one will vent to a subatmospheric environment, in particular one with a strong vacuum, which may be as low as $10^{-7}$ torr ($1.33 \times 10^{-5}$ Pa). The important criterion is that the pressure differential between the elevated pressure during pressurization and the pressure upon venting should be at least two times, and preferably at least five times, the vented pressure. There is no absolute maximum differential, and it is contemplated that differentials as high as $10^{10}$ times are feasible. Typically with vacuum venting differentials of $10^8$ are convenient, which with atmospheric venting the differentials are more usually on the order of $10^4$. The object is to have sufficiently high pressure during the elevated pressurization period to force the purging gas into and through essentially all parts of the substrate including the narrowest portions of the pores and into any small cul-de-sacs within the pores, and then upon venting to have a sufficiently high pressure differential so that most of the contents of the vessel will be evacuated quickly and thoroughly during the venting. The vessel contents being evacuated will contain not only a substantial amount of the purging gas but also a substantial amount of any packing or other gas which the purging gas will have displaced during the pressurization phase of the cycle.

Each cycle is relatively short. The amount of hold time at the elevated pressure will generally be in the range of ten seconds to ten minutes. Additional hold time is not usually advantageous, since the forced convection mechanism of the present invention works most efficiently through multiple repeated cycles than by having extended times within each single cycle. Having relatively short cycles also significantly limits any occasion for an excessive exothermic reaction during any individual cycle. There will normally be a small exotherm that occurs during the first few cycles, as will be seen in FIGS. 2 and 3, but that exotherm normally dissipates quickly as most of the packing gas becomes removed and most of the sites become preconditioned or activated during the early part of the process.

The present invention is useful to prepare substrates for use in a wide variety of gas purification processes, including those for purifying both bulk gases and specialty gases. Among the bulk gases which can be purified in processes for which the present invention provides initial activation and/or preconditioning are hydrogen, oxygen, nitrogen, argon, hydrogen chloride, ammonia, air, carbon dioxide and helium. Specialty gases included silane, germane, diborane, phosphine and arsine. All of these gases may also be in mixtures having any combination of the above mentioned gases or with either other gases, such as mixtures (blends) of the speciality gases with hydrogen, nitrogen or argon as the carrier gas, especially in which the dopant (non-carrier) gas concentration is from 50 ppm up to five percent of the mixture. It is preferred that the gas or gas mixture to be decontaminated will be the same as the gas or gas mixture to be used for purging to accomplish preconditioning or activation, but the present invention also contemplates that a non-identical gas could be used in the purging if its continued presence after purging or activation will not adversely affect the purification of the contaminated gas. Thus for instance, where the gas to be decontaminated is a mixture with a small concentration of the dopant gas, it might be desired to precondition with the principal component of the mixture (i.e., the carrier gas in this case) alone as long as the substrate does not thereafter act to reduce the concentration of the dopant gas in the mixture during decontamination The present invention finds its most significant application in the preconditioning and/or activation of substrates used in gas purification processes and equipment in which the treated gas or gas mixture is to be decontaminated down to a level of no greater than 1 ppm of contaminants, preferably down to a level on the order of 1–10 ppb of contaminants, and more preferably down to a level on the order of about 1–100 ppt.

Figure 2:
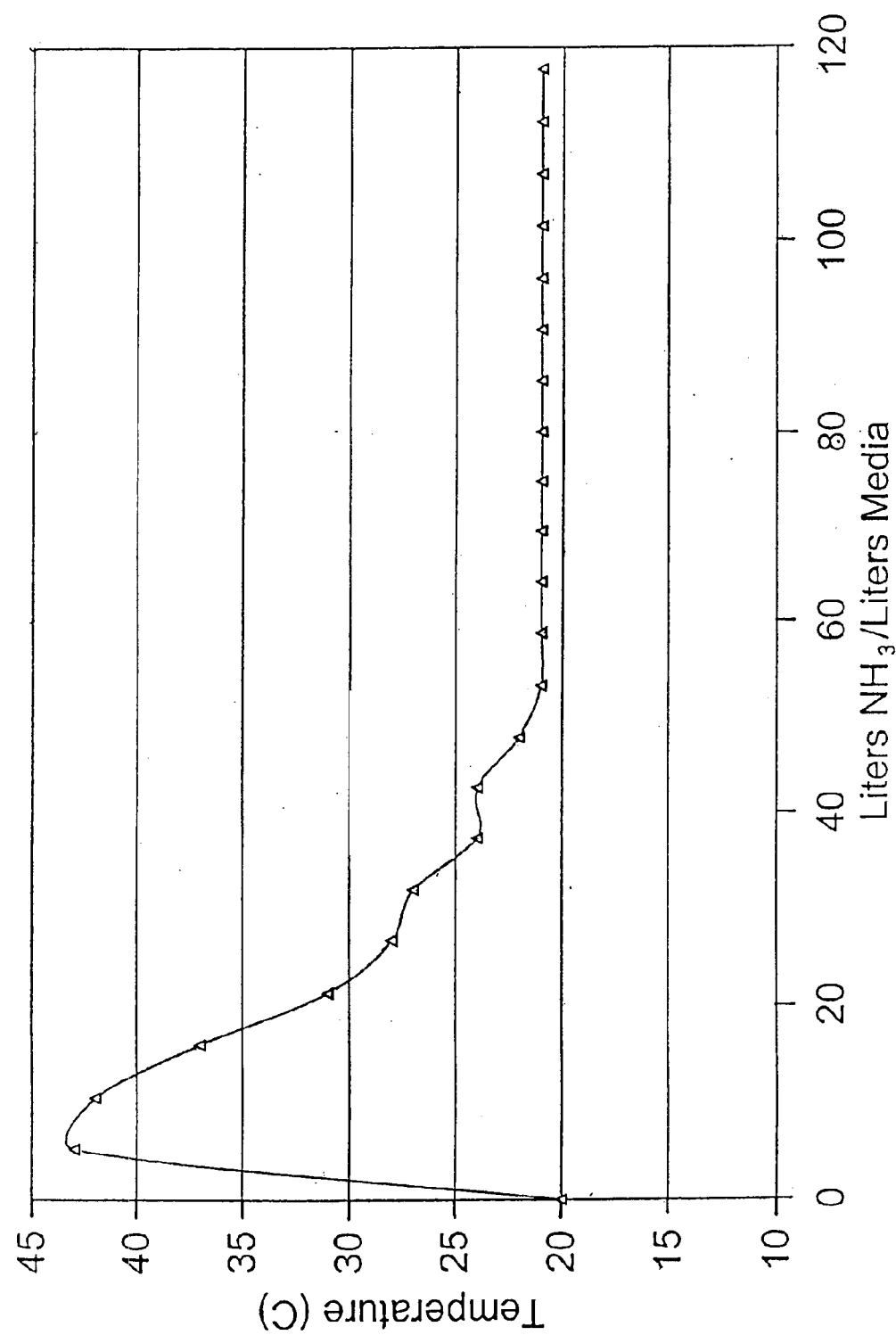
FIG. 2 is a graph from a preconditioning process for an ammonia purification vessel using the forced convention of the present invention, also showing the comparison of quantity of purging gas used versus temperature reached.

The superiority of this process is illustrated in FIGS. 1, 2 and 3, which illustrate preconditioning with ammonia to purge an ammonia decontamination substrate of packing gas (nitrogen). It is conventional to determine completion of preconditioning in a practical sense by monitoring the temperature of the interior of the vessel. An exotherm occurs early in the preconditioning process as the packing gas is displaced. As the concentration of the packing gas decreases the exotherm dies away and the interior of the vessel reaches an equilibrium temperature (which in the case of ammonia is about 20° C. [68° F.]), indicating that little or no significant amount of the packing gas is still present and being purged. When the equilibrium temperature has been reached and maintained for a period sufficient to confirm its presence to the operator, the preconditioning process is deemed complete. The flow of contaminated gas can then be started and the decontamination process will commence.

In FIG. 1 the substrate is shown as being preconditioned with ammonia by prior art continuous gas flow through the vessel to produce mass transfer/molecular diffusion of the ammonia through the pores of the substrate. It will be seen that almost 1200 liters of ammonia per liter of substrate must be flowed through the vessel before the exotherm reaches its equilibrium temperature level, and another 200–400 liters must be used before the presence of the equilibrium temperature is confirmed sufficiently to warrant halting the preconditioning process. The overall time involved in the process shown in FIG. 1 was 9.5 hours to initially reach the equilibrium temperature and 2.5 hours to reach a point at which the operator could reasonably conclude that equilibrium temperature had in fact been established.

In the present invention, however, as illustrated in FIG. 2, the system is cycled through 10–11 cycles (each data point) before the equilibrium temperature level is reached, and only about 5 or so more before that level is confirmed, with the total use of only 60–80 liters of ammonia per liter of substrate, a 20-fold improvement over the prior art diffusion system of FIG. 1. Also the exotherm reached (43°–45° C. [110°–113° F.]) is no greater than is reached by the prior art diffusion process preconditioning. Of equal significance with respect to the superiority of this invention is that there was a five-fold decrease in the amount of times needed to reach the initial equilibrium temperature and confirmation point, as compared to the times needed for the prior art diffusion preconditioning process of FIG. 1.

The two graphs of FIGS. 1 and 2 are shown on the same grid in FIG. 3. The dramatic reduction in ammonia usage (and also in preconditioning time) is evident in this Figure. It will be seen that the diffusion purging process has used more ammonia (and used more time) just for its first stage—reaching the peak of its exotherm—than did the present invention's forced convection purging for completion of its entire preconditioning, including the period needed to confirm that the equilibrium temperature had been reached. Thus the process of this invention can accomplish preconditioning in a small fraction of the time and with a small fraction of the gas usage relative to prior art diffusion preconditioning processes.

Not directly shown in the Figures but evident from them is the important improvement in costs of the present invention. It will be recognized that gas used for preconditioning cannot be recovered for use as a decontaminated manufacturing process gas, since upon exiting the vessel it will be contaminated with the packing gas or other materials from within the vessel which it has displaced within the substrate. Not until the preconditioning process is complete can usable manufacturing process gas be obtained from the gas purifier. Since as noted above one normally uses the same gas (or gas mixture) to precondition as will be used in the subsequent purification operation, the amount of gas used during preconditioning represents direct economic loss to the system operator. Thus in the examples shown in the Figures, the operator of the diffusion preconditioning process has lost some 1200 or more liters of ammonia while the operator of the present forced convention preconditioning process has lost only 60–80 liters. Even with a common gas such as ammonia, the economic value disparity is significant, and it will of course be much greater when the gases used are expensive mixtures or speciality gases.

The nature of the gas decontamination vessel is not critical, nor is the nature of the substrate. Each will be determined by the physical and chemical properties of the gas to be purified, and since in the preferred mode of this invention that will also be the gas used as the activating and/or preconditioning gas, there will not be any problem of incompatibility or of adverse effects with the forced convection preconditioning and/or activation of the present invention. Numerous different gas decontamination vessels and substrates for a wide variety of gases and gas mixtures are available commercially, including those available from the assignee of the present invention and patent application, Aeronex, Inc. of San Diego, Calif.

It will be evident that there are numerous embodiments of the present invention which are not expressly described above but which are clearly within the scope and spirit of the present invention. Therefore, the above description is intended to be exemplary only, and the actual scope of the invention is to be determined from the appended claims.

We claim:

1. A method for preconditioning, activating or both of a gas decontamination substrate within a vessel, which comprises:

a) filling said vessel containing said substrate with a purging gas and raising said purging gas to an elevated pressure within said vessel;

b) maintaining said purging gas at said elevated pressure for a predetermined period of time;

c) venting contents of said vessel to decrease pressure within said vessel to a lesser gas pressure, the lesser gas pressure being less than said elevated pressure, such that much of said purging gas is evacuated from said vessel; and d) repeating steps a), b) and c) at least once, whereby said substrate within said vessel becomes preconditioned or activated or both for subsequent decontamination of a contaminated gas.

2. A method as in claim 1 wherein said purging gas is the same type of gas as a gas which is to be subsequently decontaminated or is the same type of gas as a principal component of a gas mixture which is to be subsequently decontaminated.

3. A method as in claim 1 wherein a ratio of said elevated pressure to said lesser gas pressure is at least two.

4. A method as in claim 3 wherein the ratio of said elevated pressure to said lesser gas pressure is at least five.

5. A method as in claim 3 wherein the ratio of said elevated pressure to said lesser gas pressure is in a range from 2 to $10^{10}$.

6. A method as in claim 5 wherein the ratio is up to $10^8$ when the lesser gas pressure is subatmospheric or up to $10^4$ when the lesser gas pressure is substantially atmospheric.

7. A method as in claim 1 wherein said steps a), b) and c) are repeated 2–200 times.

8. A method as in claim 7 wherein said steps a), b) and c) are repeated 10–100 times.

9. A method as in claim 1 where each said step b) is continued for a period of 10 seconds to 10 minutes.

10. A method as in claim 1 wherein said purging gas is a mixture of at least two gases.

11. A method as in claim 10 wherein one of said gases is present in said mixture in a concentration in the range of 5 ppm to 5 percent of said mixture.

12. A method as in claim 10, further comprising that the relative concentrations of the gases in said mixture does not substantially change during operation of said method.

13. A method as in claim 1 wherein said purging gas is a bulk gas, a speciality gas or a gas mixture.

14. A method as in claim 13 wherein said purging gas comprises hydrogen, oxygen, nitrogen, argon, hydrogen chloride, ammonia, air, carbon dioxide, helium, silane, germane, diborane, phosphine, arsine or mixtures thereof.

15. A method as in claim 1 wherein said subsequent decontamination of said contaminated gas includes reduction of concentration of contaminants to a level of no greater than 1 ppm.

16. A method as in claim 15 wherein said subsequent decontamination of said contaminated gas includes reduction of concentration of contaminants to a level of on the order of 1–10 ppb.

17. A method as in claim 16 wherein said subsequent decontamination of said contaminated gas includes reduction of concentration of contaminants to a level of on the order of 1–100 ppt.

18. A method as in claim 1 wherein said substrate is porous.

19. A method as in claim 18 wherein said substrate has a surface area of at least 100 $m^2/g$.

20. A method as in claim 18 wherein said method is used to accomplish activation of decontamination sites on the surface of said substrate.

21. A method as in claim 18 wherein said method is used to accomplish preconditioning of said substrate by purging a packing gas from the substrate.

22. A method as in claim 21 wherein preconditioning causes a chemical reaction which generates a gaseous byproduct and accomplishing preconditioning of said substrate comprises purging said packing gas and said byproduct from the substrate.

23. A method as in claim 1 wherein said steps a), b) and c) are repeated until the temperature within said vessel passes through a maximum value and decreases to a substantially constant equilibrium value.

* * * * *